United States Patent [19]
Bosiers et al.

[11] Patent Number: 5,874,139
[45] Date of Patent: Feb. 23, 1999

[54] MULTILAYER POLYOLEFIN WITH BALANCED SEALANT PROPERTIES

[75] Inventors: Luc Bosiers, Edegem, Belgium; Jacquelyn A. deGroot, Lake Jackson, Tex.; Lawrence T. Kale, Lake Jackson, Tex.; Pak-Wing S. Chum, Lake Jackson, Tex.

[73] Assignee: The Dow Chemical Company, Midland, Mich.

[21] Appl. No.: 748,321

[22] Filed: Nov. 13, 1996

Related U.S. Application Data

[63] Continuation-in-part of Ser. No. 327,156, Oct. 21, 1994, abandoned.

[51] Int. Cl.$^6$ .............................. B29D 23/00; B32B 7/02; B32B 27/08
[52] U.S. Cl. ..................... 428/35.2; 428/36.91; 428/218; 428/349; 428/516; 525/240
[58] Field of Search .................................. 428/218, 349, 428/516, 35.2, 36.91; 525/240

[56] References Cited

U.S. PATENT DOCUMENTS

| | | | |
|---|---|---|---|
| 3,998,914 | 12/1976 | Lillis et al. ............................... | 260/897 |
| 4,302,554 | 11/1981 | Nabeta et al. ............................ | 525/71 |
| 4,405,774 | 9/1983 | Miwa et al. ........................... | 526/348.2 |
| 4,429,079 | 1/1984 | Shibata et al. ............................ | 525/240 |
| 4,438,238 | 3/1984 | Fukushima et al. ..................... | 525/240 |
| 4,981,760 | 1/1991 | Naito et al. ............................... | 428/523 |
| 5,189,106 | 2/1993 | Morimoto et al. ....................... | 525/240 |
| 5,206,075 | 4/1993 | Hodgson, Jr. ............................ | 428/216 |
| 5,218,071 | 6/1993 | Tsutsui et al. ........................... | 526/348 |
| 5,272,236 | 12/1993 | Lai et al. .................................. | 526/170 |
| 5,278,272 | 1/1994 | Lai et al. .............................. | 526/348.5 |
| 5,360,065 | 11/1994 | Farley et al. ............................. | 525/240 |
| 5,374,700 | 12/1994 | Tsutsui et al. ........................ | 526/348.3 |
| 5,382,631 | 1/1995 | Stehling et al. ......................... | 525/240 |
| 5,395,471 | 3/1995 | Obijeski et al. .................... | 156/244.11 |
| 5,395,810 | 3/1995 | Shamshoum et al. ................... | 502/113 |
| 5,408,004 | 4/1995 | Lai et al. .................................. | 525/240 |
| 5,444,145 | 8/1995 | Brant et al. .......................... | 526/348.3 |
| 5,530,065 | 6/1996 | Farley et al. ............................. | 525/192 |
| 5,635,262 | 6/1997 | Best et al. .............................. | 428/36.92 |

FOREIGN PATENT DOCUMENTS

| | | | |
|---|---|---|---|
| 2008315 | 7/1990 | Canada .............................. | C08F 4/16 |
| 0 221 726 A2 | 10/1986 | European Pat. Off. ........ | B32B 27/32 |
| 0 447 035 A3 | 9/1991 | European Pat. Off. ...... | C08F 297/08 |
| 735090 | 10/1996 | European Pat. Off. . | |
| 0 756 931 A2 | 2/1997 | European Pat. Off. ........ | B32B 27/32 |
| 90/03414 A1 | 4/1990 | WIPO ............................. | C08L 23/08 |
| 92/14784 | 9/1992 | WIPO ............................. | C08L 23/08 |
| 93/03093 | 2/1993 | WIPO . | |
| 93/03093 A1 | 2/1993 | WIPO ............................. | C08L 23/04 |
| 93/08221 A2 | 4/1993 | WIPO ............................. | C08F 10/00 |
| 93/13143 A1 | 7/1993 | WIPO ............................. | C08F 10/02 |
| 94/06857 A1 | 3/1994 | WIPO ............................. | C08L 23/04 |
| 94/12568 A1 | 6/1994 | WIPO ............................. | C08L 23/08 |
| 94/25271 | 11/1994 | WIPO ............................. | B32B 27/08 |
| 95/13321 A1 | 5/1995 | WIPO ............................. | C08L 23/04 |
| 95/33621 | 12/1995 | WIPO ............................. | B32B 27/08 |
| 96/12744 | 5/1996 | WIPO ............................. | C08F 210/18 |

OTHER PUBLICATIONS

*Modern Methods of Polymer Characterization*, pp. 103–112, (1991) "Measurement of Long–Chain Branch Frequency in Synthetic Polymers", by Alfred Rudin.

*The Journal of Chemical Physics*, vol. 17, No. 12, Dec. (1949), pp. 1301–1314, "The Dimensions of Chain Molecules Containing Branches and Rings", by Bruno H. Zimm and Walter H. Stockmayer.

*Antec 93–Be In That Number*, New Orleans, May 9–13, (1993), vol. II, "Dow Constrained Geometry Catalyst Technology (CGCT): New Rules for Ethylene a–Olefins Interpolymers–Controlled Rheology Polyolefins", pp. 1188–1192, by S. Lai and G.W. Knight.

*Journal of Rheology*, (1986), pp. 340–341, 344–345, 348–349, 352–353, 356–357, "Wall Slip in Viscous Fluids and Influence of Materials of Construction", by A.V. Ramamurthy.

*Rheometers for Molten Plastics*, (1982), pp. 97–99, by John Dealy.

*Polymer Engineering and Science*, vol. 17, No. 11, Nov. (1977), pp. 769–774, "Correlation of Low Density Polyethylene Rheological Measurements with Optical and Processing Properties", by M. Shida, R.N. Shroff, and L.V. Cancio.

"A Review of High Resolution Liquid $^{13}$ Carbon Nuclear Magnetic Resonance Characterizations of Ethylene–Based Polmers", pp. 201–317, by James C. Randall.

*ACS Symposium Series*, No. 142, pp. 94–118. "Characterization of Long–Chain Branching in Polyethylenes Using High–Field Carbon–13 NMR", by J.C. Randall.

SPE Regional Technical Conference, Quaker Square Hilton, Akron, Ohio, Oct. 1–2, (1985), pp. 107–119, "The Role of Comonomer Type and Distribution in LLDPE Product Performance", by L.D. Cady.

*Journal of Polymer Science: Polymer Physics Edition*, vol. 20, pp. 441–455 (1982), "Determination of Branching Distributions in Polyethylene and Ethylene Copolymers", by L. Wild, T.R. Ryle, D.C. Knobeloch, and I.R. Peat.

(List continued on next page.)

*Primary Examiner*—Donald R. Wilson

[57] ABSTRACT

The subject invention generally provides a multilayer structure that includes a polymer mixture made from at least two polymer component materials. The invention particularly pertains to a multilayer structure containing an improved sealant layer and a polypropylene layer, wherein the sealant layer is made from a homogeneously branched ethylene polymer having particular molecular weight characteristics and a second ethylene polymer. The sealant layer has balanced properties such low heat seal and hot tack initiation temperature, a high hot tack strength and a broad hot tack seal window. The multilayer structure is particularly useful as a biaxially oriented polypropylene (BOPP) packaging film structure.

11 Claims, 3 Drawing Sheets

OTHER PUBLICATIONS

*Antec 93,* pp. 58–62, "Flexomer Polyolefins, A Unique Class of Ethylene Copolymers for Low Temperature Film Applications", by D.C. Eagar, G.E. Ealer, S.A. Bartocci and D.M. Kung.

Worldwide Metallocene Conference Met Con '94, May 25–27, (1994), "Improved Processing and Performance Balance of Polyethylene Resins Using Metallocene Catalyst Technology", by Mark A. Wendorf.

Speciality Plastics Conference 1990–The Raw Materials Scenario for PE and PP Film Applications and Markets, Dec. 3–4, "High Value Added Film Using and Olefin Based Elastomer", by M. Tanaka.

*Packaging Technology and Engineering,* Apr. 1994, pp. 34–37, "Single–Site Catalysts Produce Tailor–Made, Consistent Resins", by David F. Simon.

"Polyolefin Modification with EXACT™ Plastomers", (before Jul. 1994 and after Sep. 1992), pp. 539–564, by T.C. Yu, G.J. Wagner.

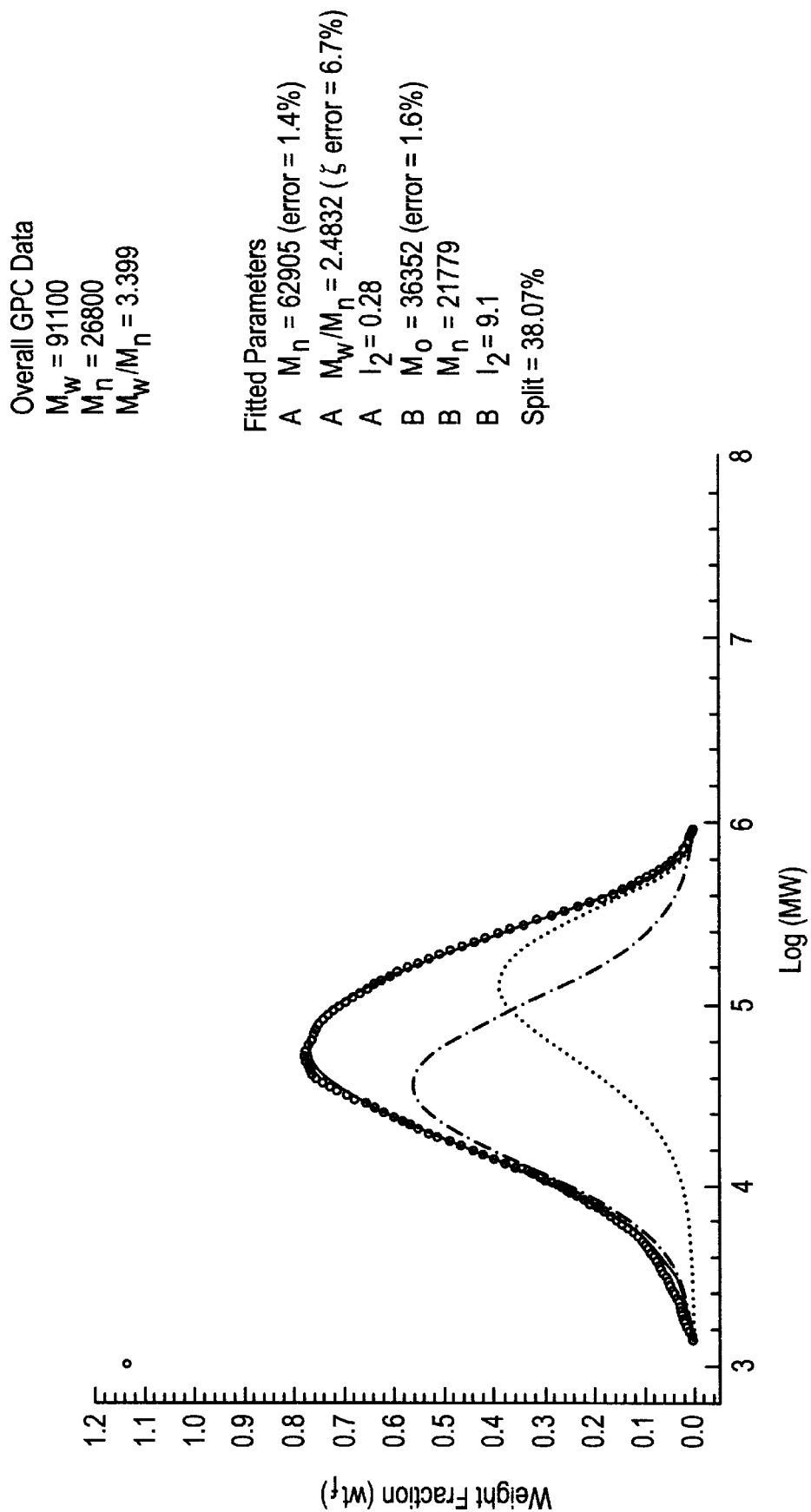

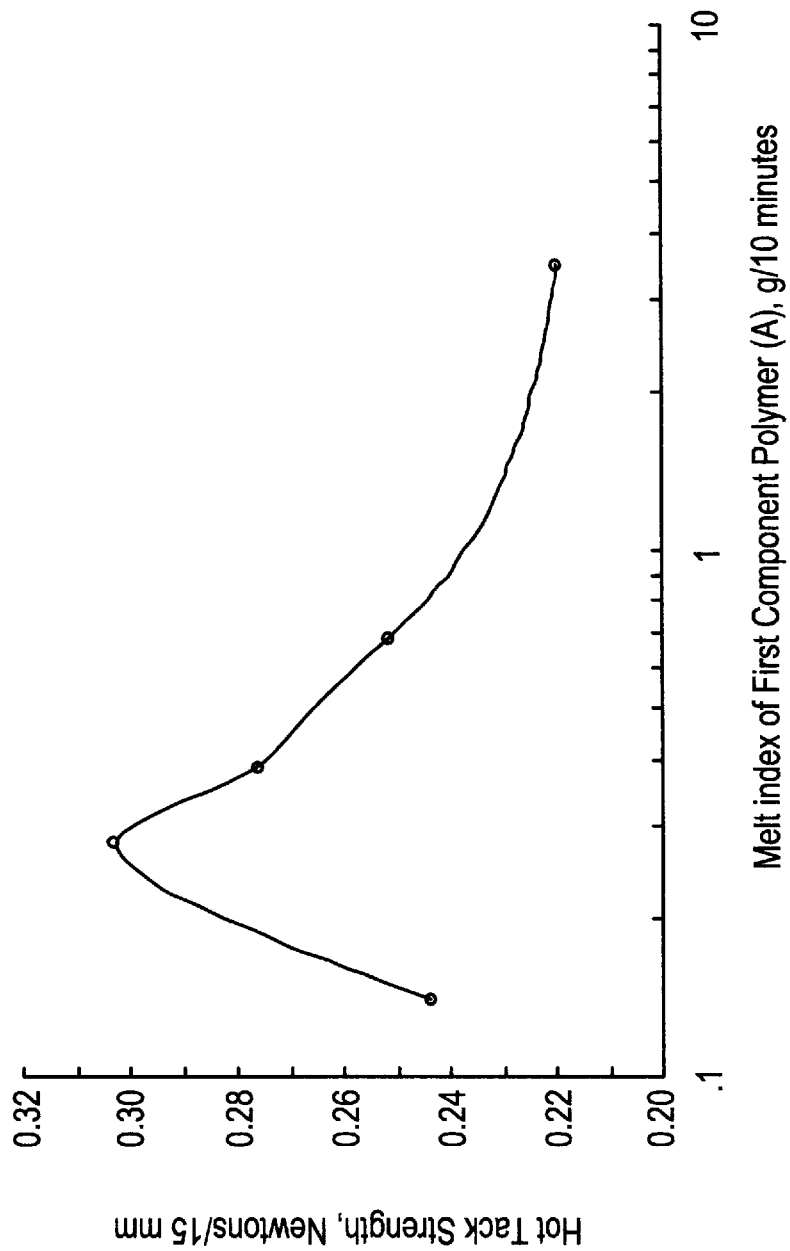

MULTILAYER POLYOLEFIN WITH BALANCED SEALANT PROPERTIES

CROSS-REFERENCE TO RELATED APPLICATIONS

This application is a continuation-in-part application of application Ser. No. 08/0327,156, filed Oct. 21, 1994,, abandoned which is related to the following applications: U.S. patent application Ser. No. 08/054,379, filed on Apr. 28, 1993, now abandoned; U.S. patent application Ser. No. 08/010,958, filed on Jan. 29, 1993, now abandoned; U.S. patent application Ser. No. 08/239,495, filed on May 9, 1994,, now abandoned; and U.S. patent application Ser. No. 08/239,496, filed on May 9, 1994, now abandoned the disclosures of all of which are incorporated herein by reference.

FIELD OF THE INVENTION

This invention pertains to a polyolefin sealant composition comprising at least two polymer component materials. Particularly, the invention pertains to a multilayer structure comprising a sealant layer and a polypropylene layer, wherein the sealant layer is made from a polymer mixture comprised of at least one homogeneously branched ethylene polymer having particular molecular weight characteristics and a second ethylene polymer.

BACKGROUND OF THE INVENTION

Although polyolefin resins have long found utility in food packaging and food storage container applications, a polyolefin composition with the desired balance of properties in the form of a film, coating or molding has not been available to fabricators and pakagers. For example, an optimum polyolefin resin composition for use as a sealant layer in packaging and storage applications would possess a number of key performance properties such as low heat seal and hot tack initiation temperatures, a high hot tack strength, a broad hot tack sealing window, good interlayer adhesion, a high softening point and low hexane extractables levels.

The commercial importance of balanced sealant properties is well understood. That is, low heat seal and hot tack initiation temperatures are important for improved sealing speeds and reduced energy utilization. A broad hot tack sealing window at high hot tack strengths (i.e., the seal temperature range where the hot tack strength is greater than or equal to about 46 g/cm as measured by the Dupont spring method or gl eater than or equal to about 3.31 Newton/15 mm (5.6 N/in.) as measured using a mechanical hot tack tester such as, for example, a Top Wave Sealing unit) is important for insuring package integrity, sealing equipment flexibility and low package leaker rates. Good interlayer adhesion is also important for good package integrity as well as good package or container aesthetics. High softening points or temperatures are desired where goods are packaged at elevated temperatures such as in hot-fill applications. Low hexane extractables are required for food contact applications.

Traditionally, when attempting to achieve balanced sealant properties, enhancement of one particular resin property has required some sacrifice with respect to another important property. For instance, with ethylene alpha-olefin polymers, low heat seal and hot tack initiation temperatures are typically achieved by increasing the comonomer content of the resin. Conversely, high Vicat softening points and low levels of n-hexane extractives are typically achieved by decreasing the comonomer content of the resin. Accordingly, improving the resin with respect to seal initiation typ ically results in proportionally reduced Vicat softening temperature and proportionally increased extractable level.

Several important multilayer packaging and storage structures consisting of a polypropylene layer, particularly, a biaxially oriented polypropylene homopolymer (BOPP) base or core layer. Typically, BOPP structures utilize polypropylene copolymers and terpolymers as sealant materials (and/or adhesive layers) to insure good interlayer adhesion to the BOPP base layer. While polypropylene copolymers and terpolymers do indeed provide good interlayer adhesion to BOPP base layers as well as good hot tack strength performance, these copolymers and terpolymers invariably exhibit undesirably high heat seal and hot tack initiation temperatures.

Other polyolefin materials have also been used as sealant materials for multilayer packaging and storage structures. However, in general, known polyolefin sealant materials do not provide the desired overall property balance and/or process flexibility desired by converters and packagers. For example, TAFMER™ resins (supplied by Mitsui Petrochemical) are known to provide sealants with relatively low seal initiation temperatures, however, TAFMER™ resins are not known to provide the overall desired performance balance (either as single component sealants nor when used as polymer blend component materials). Also, TAFMER™ resins are considered to be relatively expensive and are continually in limited commercial supply.

Relative to TAFMER™ resins, heterogeneously branched ethylene polymers such as linear low density polyethylene (LLDPE) and ultra low density polyethylene (ULDPE) are readily available. However, similar to TAFMER™ resins, in general, heterogeneously branched ethylene polymers do not provide the desired overall property balance for optimum use as sealant materials and they are particularly ill-suited for BOPP structures. For example, heterogeneously branched linear low density polyethylene (LLDPE) (and, as such, sealant layers made from these polymers) are particularly deficient in regards to interlayer adhesion to polypropylene layers.

Homogeneously branched ethylene polymers such as AFFINITY™ resins supplied by The Dow Chemical Company are also available for use as sealant materials. While homogeneously branched ethylene polymer materials generally exhibit improved sealing initiation performance, the hot strength of these resins is invariably compromised to meet Theological requirements for coextrusions and thereby insure good interfacial stability.

U.S. Pat. No. 4,429,079 to Shibata, et al. discloses an ethylene/alpha-olefin copolymer blend composition comprising a mixture of (A) 95-40 weight percent of a random copolymer of ethylene and an alpha-olefin having 5 to 10 carbon atoms which has a melt index of 0.1 to 20 g/10 min., a density of 0.910 to 0.940 g/cc, a crystallinity by X-rays of 40 to 70%, a melting point of 115 to 130° C., and an ethylene content of 94 to 99.5 mol %; and (B) 5 to 60% by weight of a random copolymer of ethylene and an alpha-olefin having 3 to 10 carbon atoms which has a melt index of 0.1 to 50 g/10 min., a density of 0.870 to 0.900 g/cc, a crystallinity by X-rays of 5 to 40%, a melting point of 40 to 100° C. and an ethylene content of 85 to 95 mol %. The (A) component polymer is said to be produced by a titanium catalyst system and the (B) component polymer is said to be produced by a vanadium catalyst. Both of these catalyst systems are known as Ziegler-Natta type catalysts which produce linear ethylene alpha-olefin polymers. That is, the polymer will have a linear molecular backbone without any long chain branching. Further, the (A) component polymer will also have a heterogeneously branched short chain distribution, while the (B) component polymer will have a homogeneously branched short chain distribution. The film fabricated from the Shibata et al. composition allegedly has good low-temperature heat sealability, heat seal strength, pin hole resistance, transparency and impact strength, making such film suitable for premium packaging applications. However, Shibata et al. do not disclose films with high ultimate hot tack strengths (i.e., values≧3.31 N/mm) and analysis of the data disclosed in the Examples provided by Shibataet al. reveals the properties of such film, particularly heat sealability, are additive and vary linearly with respect to the densities of blended component polmer.

U.S. Pat. No. 4,981,760 to Naito et al. discloses a polyethylene mixture having a density of from 0.900 to 0.930 g/cc and melt flow rate of from 0.1 to 100 g/10 in., which comprises (I) from 60 to 99 parts by weight of an ethylene-α-olefin random copolymer comprising ethylene and an α-olefin having from 4 to 10 carbon atoms, the copolymer having an α-olefin content of from 2.0 to 10 mol % and a density of from 0.895 to 0.915 g/cc, the programmed-temperature thermogram of said copolymer as determined with a differential scanning calorimeter after being completely melted and then gradually cooled showing an endothermic peak in a range of from 75° to 100° C., with the ratio of an endotherm at said peak to the total endotherm being at least 0.8, and (II) from 1 to 40 parts by weight of high-density polyethylene having a density of at least 0.945 g/cc, the programmed-temperature thermogram of said high-density polyethylene as determined with a differential scanning calorimeter after being completely melted and allowed to cool showing an endothermic peak at 125° C., or higher, wherein the sum of (I) and (II) amounts to 100 parts by weight. The component polymer (I) is said to be manufactured using a vanadium catalyst and the film allegedly has improved heat sealability and hot tack. Naito et al. do not disclose fabricated films comprising a component polymer (II) with a density less than 0.945 g/cc. Also, Naito et al. describe a film having low heat seal or hot tack initiation temperatures when the lower density component polymer (I) concentration is fairly high (i.e.,≧85 parts) which is expected to result in lower Vicat softening points.

U.S. Pat. No. 5,206,075 to Hodgson et al. discloses a multilayer heat sealable film comprising a base layer and a heat sealable layer superimposed on one or both sides of the base layer. As the base layer, Hodgson discloses a blend of: (a) an olefin polymer having a density greater than 0.915 g/cc; and (b) a copolymer of ethylene and a $C_3$-$C_{20}$ alpha-monoolefin, with the copolymer (b) having a density of from about 0.88 to about 0.915 g/cc, a melt index of from about 0.5 to about 7.5 dg/min, a molecular weight distribution of no greater than about 3.5, and a composition distribution breadth index greater than about 70 percent. As the heat sealable layer, Hodgson discloses a layer comprising a copolymer as defined in (b) with respect to the base layer. Hodg son does not disclose the use of a blend, such as that employed in the base layer (a), as a suitable sealing layer and the preferred olefin polymer for component (a) of the base layer is a copolymer of propylene with about 1–10 mole percent ethylene. As such, this disclosure appears to generally indicate that good interlayer adhesion requires that the base layer and sealant layer have similar olefin chemistries.

The compositions disclosed by Shibata et al., Naito et al. and Hodgson et al. and other known seal ant materials are deficient in one respect or another. These materials do not provide the balanced sealant properties desired by converters and packagers. In particular, known materials are not particularly well-suited for use as sealant materials in BOPP structures. As such, there is a need for polymer compositions characterized by good interlayer adhesion to polypropylene, low heat seal and hot tack imatiation temperatures, high hot tack strength and a broad high hot tack sealing window There is also a need for polymer sealant compositions which have low levels of n-hexane extractives, i.e., less than 15 weight percent, preferably less than 10 weight percent, more preferably less than 6 weight percent, most preferably less than 3 weight percent, as such compositions would be useful in direct food contact applications.

SUMMARY OF THE INVENTION

We have discovered a novel multilayer structure comprised of a polymer mixture of at least two polymer component materials where the first ethylene polymer component is characterized as having an optimized high molecular weight and a uniform shor chain branching or compositional distribution. The novel polymer mixture provides an improved sealant layer with balanced properties for use in multilayer packaging and storage structures. The balanced sealant properties include good interlaer adhesion to polypropylene, low heat seal and hot tack initiation temperatures, a broad high hot tack sealing window and, for a given polymer density, a relatively high softening temperature to, for example, prevent sticking to the machine direction orientation rollers or provide good machinability. The improved sealag t is particularly useful for multilayer structures comprising a polypropylene layer and especially a biaxially oriented polypropylene (BOPP) film layer.

A broad aspect of the present invention is a multilayer structure comprising as a polymer mixture:

(A) from about 5 to about 95 weight percent, based on the total weight of the polymer mixture, of at least one first ethylene polymer which is a homogeneously branched substantially linear ethylene polymer or a homogeneously branched linear ethylene polymer, wherein the first ethylene polymer is characterized as having:

i. an $I_2$ melt index in the range of from greater than about 0.14 g/10 minutes to less than about 0.67 g/10 minutes, as measured by ASTM D-1238 Condition 190° C./2.16 kg, ii. a density in the range of about 0.85 to about 0.92 g/cc, as measured in accordance with ASTM D-792, iii. a molecular weight distribution, $M_w/M_n$, as determined by gel permeation chromatography of less than 3.5, iv. a single differential scanning calorimetry, DSC, melting peak between −30 and 150° C., and v. a short chain branching distribution index (SCBDI) greater than 50 percent, and (B) from about 5 to about 95 weight percent, based on the total weight of the polymer mixture, of at least one second ethylene polymer which is a homogeneously branched ethylene polymer or a heterogeneously brand linear ethylene polymer wherein the second ethylene polymer is characterized as having a density in the range of about 0.89 g/cc to about 0.965 g/cc, wherein the polymer mixture is characterized as having a density of from about 0.89 g/cc to about 0.93 g/cc, as measured in accordance with ASTM D-792, and an $I_2$ melt index in the range of from about 1 g/10 minutes to about 5 g/10 minutes, as measured by ASTM D-1238 Condition 190° C./2.16 kg, and wherein the molecular weight of the at least one first polymer is higher than the molecular weight of the at least one second polmer.

Surprisingly, while sealant layers made from heterogeneously branched ethylene polymer are characterized as having seal initiation temperatures substantially higher than their respective softening temperature, the improved sealant layer of the present invention is characterized as having a comparatively high Vicat softeningltemperature relative to its heat seal initiation temperature. That is, for a minimum sealing strength of about 1.8 Newtons/15 mm, the sealant layer has a film heat seal initiation temperature that ranges from equal to or at least 4.5° C. lower than its Vicat softening temperature and, more surprisingly, in particular embodiments, from equal to or at least 6° C. lower than its Vicat softening temperature.

The subject invention further provides polymer mixtures as defined herein in the form of a fabricated film, film layer, coating, a thermoformed article or a molded article for such uses as cook-in bags, pouches for flowable materials, barrier shrink and non-barrier shrink films, bottle caps, lidding stock and packaging film sealant layers.

These and other embodiments will be more fully described in the Detailed Description set forth below.

BRIEF DESCRIPTION OF THE DRAWINGS

FIG. 2 is a Deconvoluted Gel Permeation Chromatography (GPC) curve-response for Inventive Example 1.

FIG. 3 is a plot of hot tack strength, in Newtons/15 mm, as a function of the $I_2$ melt index, in grams/10 minutes, of the first ethylene polymer component (A).

DEFINITIONS OF TERMS

Figure 1:
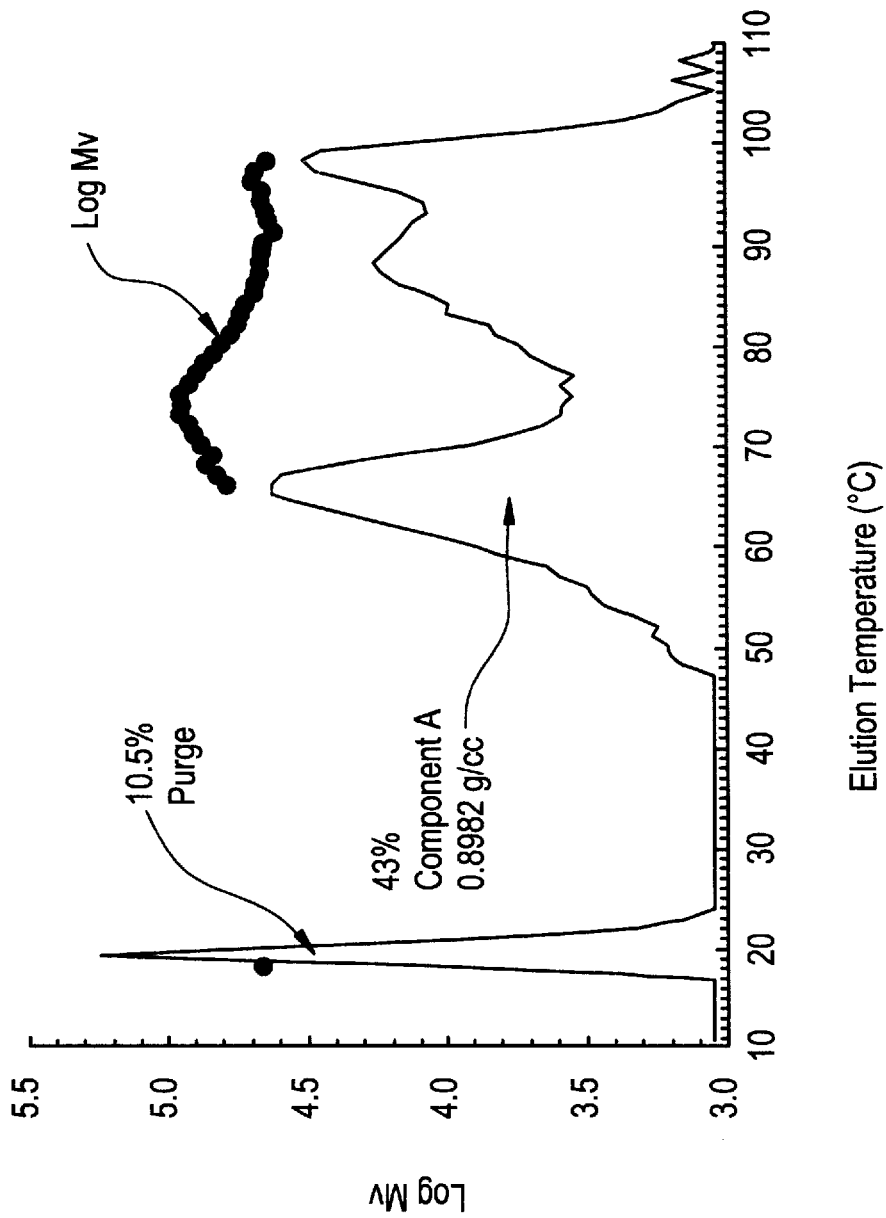
FIG. 1 is an Analytical Temperature Rising Elution Fractionation (ATREF) curve-response for Inventive Example 1.

The term "polymer", as used herein, refers to a polymeric compound prepared by polymerizing monomers, whether of the same or a different type. The generic term "polymer" thus embraces the terms "homopolymer," "copolymer," "terpolymer" as well as "interpolymer."

The term "interpolymer", as used herein, refers to polymers prepared by the polymerization of at least two different types of monomers. The generic term "interpolymer" thus includes the term "copolymers" (which is usually employed to refer to polymers prepared from two different monomers) as well as the term "terpolymers" (which is usually employed to refer to polymers prepared from three different types of monomers).

DETAILED DESCRIPTION OF THE INVENTION

The first ethylene polymer component of the polymer mixture used in the invention, Component (A), is at least one homogeneously branched substantially linear ethylene polymer or at least one homogeneously branched linear ethylene polymer. The second component polymer of the polymer mixture is at least one ethylene alpha-olefin interpolymer. However, preferably the first ethylene polymer component (A) is at least one substantially linear ethylene polymer and the second component polymer (B) is at least one heterogeneously branched linear ethylene polymer. Substantially linear ethylene polymers are generally preferred as the first ethylene polymer component (A) due to their improved melt extrusion processability and unique Theological properties as described by Lai et. al in U.S. Pat. Nos. 5,272,236 and 5,278,272, the disclosures of which are incorporated herein by reference.

The molecular weight of polyolefin polymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. The first ethylene polymer component (A) has an $I_2$ melt index in the range of from greater than about 0.14 g/10 minutes to less than about 0.67 g/10 minutes, preferably from greater than or equal to about 0.15 g/10 minutes to less than or equal to about 0.65 g/10 minutes, more preferably from greater than or equal to about 0.16 g/10 minutes to less than or equal to about 0.6 g/10 minutes, and most preferably from greater than or equal to about 0.16 g/10 minutes to less than or equal to about 0.5 g/10 minutes.

Component (A) and component (B) will be independently characterized by an $I_2$ melt index. By "independently characterized" it is meant that the $I_2$ melt index of component (A) need not be the same as the $I_2$ melt index of component (B). The second ethylene polymer component (B) may have an $I_2$ melt index in the range of from greater than or equal to about 0.01 g/10 minutes to less than or equal to about 500 g/10 minutes, preferably from greater than or equal to about 0.1 g/10 minutes to less than or equal to about 50 g/10 minutes, more preferably from greater than or equal to about 1 g/10 minutes to less than or equal to about 20 g/10 minutes, and most preferably from greater than or equal to about 1 g/10 minutes to less than or equal to about 10 g/10 minutes.

The overall melt index of the polymer mixture is preferably in the range of from about 1 to about 5 g/10 minutes, more preferably from about 2 to about 4 g/10 minutes.

Other measurements useful in characterizing the molecular weight of substantially linear ethylene interpolymers and homopolymers involve melt index determinations with higher weights, such as, for common example, ASTM D-1238, Condition 190° C./10 kg (formerly known as "Condition N" and also known as $I_{10}$). The ratio of a higher weight melt index determination to a lower weight determination is known as a melt flow ratio, and for measured $I_1$ and the $I_2$ melt index values the melt flow ratio is conveniently designated as $I_{10}/I_2$. For the substantially linear ethylene polymers used to prepare the films of the present invention, the melt flow ratio indicates the degree of long chain branching, i.e., the higher the $I_{10}/I_2$ melt flow ratio, the more long chain branching in the polymer. In addition to being indicative of more long chain branching, higher $I_{10}/I_2$ ratios are indicative of high extensional viscosity.

While for balanced sealant properties high molecular weight, a high degree of long chain branching and/or high extensional viscosity are generally preferred, we have discovered that there is an optimum range with respect to each of these polymer properties, particularly with respect to the molecular weight of the first ethylene polymer component (A). While the optimum molecular weight range for the first ethylene polymer component (A) is defined above by a specific $I_2$ melt index range, it is believed that the optimum range of long chain branching for the substantially linear ethylene polymer used in the present invention as a first ethylene polymer component (A) and as defined by an $I_{10}/I_2$ melt flow ratio is in the range of from geater than about 6 to about less than about 12 and especially from greater than about 7 to less than about 10. Embodiments that meet the specified melt index range and also meet the above $I_{10}/I_2$ range are particularly preferred embodiments of the present invention.

The first ethylene polymer component (A) generally constitutes from about 5 to about 95 weight percent of the polymer mixture, based on the total weight of the polymer mixture, preferably from about 15 to about 75 weight percent, and more preferably from about 30 to about 55 weight percent, based on the total weight of the polymer mixture. Conversely, the polymer mixture comprises from about 5 to about 95 weight percent, preferably from about 25 to about 85, more preferably from about 45 to about 70 weight percent of the at least one second ethylene polymer component (B), based on the total weight of the polymer mixture.

The first ethylene polymer component (A) has a density in the range of from about 0.85 to about 0.92 g/cc, preferably from about 0.87 to about 0.915 g/cc, more preferably from about 0.885 to about 0.905 g/cc (as measured in accordance with ASTM D-792). The second ethylene polymer component (B) has a density in the range of from about 0.90 to about 0.96 g/cc, preferably from about 0.91 to about 0.95 g/cc, more preferably from about 0.92 to about 0.93 g/cc (as measured in accordance with ASTM D-792). Additionally, it is preferred that the density of the at least one first ethylene polymer component (A) is lower than the density of the at least one second ethylene polymer component (B).

The overall density of the polymer mixture is preferably in the range of from about 0.90 to about 0.92 g/cc, more preferably in the range of from about 0.905 to about 0.925 g/cc, and most preferably in the range of from about 0.91 to about 0.92 g/cc (as measured in accordance with ASTM D-792).

Suitable ethylene polymers for use as the second component polymer (B) include substantially linear ethylene interpolymers, homogeneously branched linear ethylene interpolymers, heterogeneously branched linear ethylene interpolymers (e.g., linear low density polyethylene (LLDPE), medium density polyethylene (MDPE), high density polyethylene (HDPE) and ultra low or very low density polyethylene (ULDPE or VLDPE)), and combinations or mixtures thereof.

Substantially linear ethylene polymers are sold under the designation of AFFINITY™ and ENGAGE™ resins by The Dow Chemical Company and Dupont Dow Elastomers, respectively. Homogeneously branched linear ethylene polymers are sold under the designation of TAFMER and EXACT resins by Mitsui Chemical Corporation and Exxon Chemical Corporation, respectively. Heterogeneously branched linear ethylene polymers are sold under the designations of ATTANE™ and DOWLEX™ by The Dow Chemical Company and under the designation of FLEXOMER by Union Carbide Corporation.

The term "homogeneously branched linear ethylene polymer" is used in the conventional sense in reference to a linear ethylene interpolymer in which the comonomer is randomly distributed within a given polymer molecule and wherein substantially all of the polymer molecules have the same ethylene to comonomer molar ratio. The terms refer to an ethylene interpolymer that is characterized by a relatively high short chain branching distribution index (SCBDI) or composition distribution branching index (CDBI). That is, the interpolymer has a SCBDI greater than or equal to about 50 percent, preferably greater than or equal to about 70 percent, more preferably greater than or equal to about 90 percent and essentially lack a measurable high density (crystalline) polymer fraction.

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. Nos. 4,798,081; 5,008,204; or by L. D. Cady, "The Role of Comonomer Type and Distribution in LLDPE Product Performance," SPE Regional Technical Conference, Quaker Square Hilton, Akron, Ohio, Oct. 1–2, pp. 107–119 (1985), the disclosures of all which are incorporated herein by reference. However, the preferred TREF technique does not include purge quantities in SCBDI calculations. More preferably, the monomer distribution of the interpolymer and SCBDI are determined using $^{13}C$ NMR analysis in accordance with techniques described in U.S. Pat. No. 5,292,845 and by J. C. Randall in Rev. Macromol. Chem. Phys., C29, pp. 201–317, the disclosures of both of which are incorporated herein by reference.

In addition to referring to a homogeneous (or narrow) short branching distribution, the term "homogeneously branched linear ethylene interpolymer" also means the interpolymer does not have long chain branching. That is, the ethylene interpolymer has an absence of long chain branching and a linear polymer backbone in the conventional sense of the term "linear." However, the term "homogeneously branched linear ethylene polymer" does not refer to high pressure branched polyethylene which is known to those skilled in the art to have numerous long chain branches. Homogeneously branched ethylene polymers can be made using polymerization processes (e.g., those described by Elston in U.S. Pat. No. 3,645,992) which provide a uniform (narrow) short branching distribution (i.e., homogeneously branched). In his polymerization process, Elston uses soluble vanadium catalyst systems to make such polymers, however others such as Mitsui Chemical Corporation and Exxon Chemical Corporation have used so-called single site catalyst systems to make polymers having a similar homogeneous structure. Homogeneously branched linear ethylene polymers can be prepared in solution, slurry or gas phase processes using hafnium, zirconium and vanadium catalyst systems. Ewen et al. in U.S. Pat. No. 4,937,299 describe a method of preparation using metallocene catalysts. The disclosures of Elston and Ewen et al. are incorporated herein by reference.

The term "heterogeneously branched linear ethylene polymer" is used herein in the conventional sense in reference to a linear ethylene interpolymer having a comparatively low short chain branching distribution index. That is, the interpolymer has a relatively broad short chain branching distribution. Heterogeneously branched linear ethylene polymers have a SCBDI less than about 50 percent and more typically less than about 30 percent.

Heterogeneously branched ethylene polymers are well known among practitioners of the linear polyethylene art. Heterogeneously branched ethylene polymers are prepared using conventional Ziegler-Natta solution, slurry or gas phase polymerization processes and coordination metal catalysts as described, for example, by Anderson et al. in U.S. Pat. No. 4,076,698, the disclosure of which is incorporated herein by reference. These conventional Ziegler-Natta type linear polyethylenes are not homogeneously branched, do not have any long-chain branching and, as such, have a linear polymer backbone in the conventional sense of the term "linear." Also, heterogeneously branched ethylene polymers do not show any substantial amorphism at lower densities since they inherently posses a substantial high density (crystalline) polymer fraction. At densities less than 0.90 g/cc, these materials are more difficult to prepare than homogeneously branched ethylene polymer and are also more difficult to pelletize than their higher density counterparts. At such lower densities, heterogeneously branched ethylene polymer pellets are generally more tacky and have a greater tendency to clump together than their higher density counterparts.

Typically, the homogeneously branched linear ethylene polymer and the heterogeneously branched ethylene polymer are ethylene/α-olefin interpolymers, wherein the α-olefin is at least one $C_3$–$C_{20}$ α-olefin (e.g., propylene, 1-butene, 1-pentene, 4-methyl-1-pentene, 1-hexene, 1-octene and the like) and preferably the at least one $C_3$–$C_{20}$ α-olefin is 1-octene. Most preferably, the ethylene/α-olefin interpolymer is a copolymer of ethylene and a $C_3$–$C_{20}$ (α-olefin, especially an ethylene/$C_4$–$C_6$ α-olefin copolymer and most especially an ethylene/1-octene copolymer.

The term "substantially linear ethylene polymer" as used herein refers to homogeneously branched ethylene/α-olefin interpolymers that have a narrow short chain branching distribution and contain long chain branches as well as short chain branches attributable to homogeneous comonomer incorporation. The long chain branches are of the same structure as the backbone of the polymer and are longer than the short chain branches. The polymer backbone of substantially linear α-olefin polymers is substituted with an average of 0.01 to 3 long chain branch/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branches/1000 carbons.

Long chain branching is defined herein as a chain length of at least 7 carbons, above which the length cannot be distinguished using $^{13}C$ nuclear magnetic resonance spectroscopy. The long chain branch can be as long as about the same length as the length of the polymer backbone to which it is attached. Long chain branches are obviously of greater length than of short chain branches resulting from comonomer incorporation.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285–297).

As a practical matter, current $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., J. Chem. Phys., 17,1301 (1949) and Rudin, A., *Modern Methods of Polymer Characterization*, John Wiley & Sons, New York (1991) pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mis., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log($I_2$, Melt Index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

The substantially linear ethylene polymers used in the present invention are a unique class of compounds that are further defined in U.S. Pat. No. 5,272,236, Ser. No. 07/776, 130, filed Oct. 15, 1991 and in U.S. Pat. No. 5,278,272, Ser. No. 07/939,281, filed Sep. 2, 1992, each of which is incorporated herein by reference.

Substantially linear ethylene polymers differ significantly from the class of polymers conventionally known as homogeneously branched linear ethylene polymers described, for example, by Elston in U.S. Pat. No. 3,645,992, in that substantially linear ethylene polymers do not have a linear polymer backbone in the conventional sense of the term "linear." Substantially linear ethylene polymers also differ significantly from the class of polymers known conventionally as heterogeneously branched traditional Ziegler polymerized linear ethylene interpolymers (for example, ultra low density polyethylene, linear low density polyethylene or high density polyethylene made, for example, using the technique disclosed by Anderson et al. in U.S. Pat. No. 4,076,698, in that substantially linear ethylene interpolymers are homogeneously branched interpolymers. Substantially linear ethylene polymers also differ significantly from the class known as free-radical initiated highly branched high pressure low density ethylene homopolymer and ethylene interpolymers such as, for example, ethylene-acrylic acid (EAA) copolymers and ethylene-vinyl acetate (EVA) copolymers, in that substantially linear ethylene polymers do not have equivalent degrees of long chain branching and are made using single site catalyst systems rather than free-radical peroxide catalysts systems.

Single site polymerization catalyst, (for example, the monocyclo-pentadienyl transition metal olefin polymerization catalysts described by Canich in U.S. Pat. No. 5,026, 798 or by Canich in U.S. Pat. No. 5,055,438) or constrained geometry catalysts (for example, as described by Stevens et al. in U.S. Pat. No. 5,064,802) can be used to prepare substantially linear ethylene polymers, so long as the catalysts are used consistent with the methods described in U.S. Pat. No. 5,272,236 and in U.S. Pat. No. 5,278,272. Such polymerization methods are also described in PCT/US 92/08812 (filed Oct. 15, 1992). However, the substantially linear ethylene polymers are preferably made by using suitable constrained geometry catalysts, especially constrained geometry catalysts as disclosed in US Application Serial Nos.: 545,403, filed Jul. 3, 1990; U.S. Pat. No. 5,132,380; U.S. Pat. No. 5,064,802; U.S. Pat. No. 5,153,157; U.S. Pat. No. 5,470,993; U.S. Pat. No. 5,453,410; U.S. Pat. No. 5,374,696; U.S. Pat. No. 5,532,394; U.S. Pat. No. 5,494,874; U.S. Pat. No. 5,189,192; the teachings of all of which are incorporated herein by reference.

Suitable cocatalysts for use herein include but are not limited to, for example, polymeric or oligomeric aluminoxanes, especially methyl aluminoxane or modified methyl aluminoxane (made, for example, as described in U.S. Pat. No. 5,041,584, U.S. Pat. No. 4,544,762, U.S. Pat. No. 5,015,749, and/or U.S. Pat. No. 5,041,585, the disclosures of which are incorporated herein by reference) as well as inert, compatible, non-coordinating, ion forming compounds. Preferred cocatalysts are inert, non-coordinating, boron compounds.

The polymerization conditions for manufacturing the substantially linear ethylene polymers used in the present invention are preferably those useful in the continuous solution polymerization process, although the application of the present invention is not limited thereto. Continuous slurry and gas phase polymerization processes can also be used, provided the proper catalysts and polymerization conditions are employed. To polymerize the substantially linear polymers useful in the invention, the single site and constrained geometry catalysts mentioned earlier can be used, but for substantially linear ethylene polymers the polymerization process should be operated such that substantially linear ethylene polymers are indeed formed. That is, not all polymerization conditions inherently make the substantially linear ethylene polymers, even when the same catalysts are used. For example, in one embodiment of a polymerization process useful in making substantially linear ethylene polymers, a continuous process is used, as opposed to a a batch process.

The substantially linear ethylene polymer for use in the present invention is characterized as having (a) a melt flow ratio, in range from greater than about 6 to less than about 12, (b) a molecular weight distribution, $M_w/M_n$, as determined by gel permeation chromatography and defined by the equation:

$(M_w/M_n) \leq (I_{10}/I_2) - 4.63$, (c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30 and 150° C., and (e) a short chain branching distribution index greater than about 50 percent.

The substantially linear ethylene polymers used in this invention are homogeneously branched interpolymers and essentially lack a measurable "high density" fraction as measured by the TREF technique (i.e., have a narrow short chain distribution and a high SCBD index). The substantially linear ethylene polymer generally do not contain a polymer fraction with a degree of branching less than or equal to 2 methyls/1000 carbons. The "high density polymer fraction" can also be described as a polymer fraction with a degree of branching less than about 2 methyls/1000 carbons.

The substantially linear ethylene interpolymers for use in the present invention are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" as discussed above is used herein to indicate a copolymer, or a terpolymer, or the like, where, at least one other comonomer is polymerized with ethylene or propylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins such as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

Determination of the critical shear rate and critical shear stress in regards to melt fracture as well as other rheology properties such as "Theological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99. GER experiments are performed at a temperature of about 190° C., at nitrogen pressures between about 250 to about 5500 psig using about a 0.0754 mm diameter, 20:1 L/D die with an entrance angle of about 180°. For the substantially linear ethylene polymers described herein, the PI is the apparent viscosity (in kpoise) of a material measured by GER at an apparent shear stress of about $2.15 \times 10^6$ dyne/$cm^2$.

The substantially linear ethylene polymer for use in the invention are ethylene interpolymers having a PI in the range of about 0.01 kpoise to about 50 kpoise, preferably about 15 kpoise or less. The substantially linear ethylene polymers used herein have a PI less than or equal to about 70 percent of the PI of a linear ethylene interpolymer (either a conventional Ziegler polymerized interpolymer or a linear homogeneously branched interpolymer as described by Elston in U.S. Pat. No. 3,645,992) having an $I_2$, $M_w/M_n$ and density, each within ten percent of the substantially linear ethylene interpolymer.

An apparent shear stress versus apparent shear rate plot is used to identify the melt fracture phenomena and quantify the critical shear rate and critical shear stress of ethylene polymers. According to Ramamurthy in the *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers is at least about 50 percent greater than the critical shear rate at the onset of surface melt fracture of a linear ethylene interpolymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability and optimum sealant properties, surface defects should be minimal, if not absent. The critical shear stress at the onset of gross melt fracture for the substantially linear ethylene interpolymers used in the invention, that is those having a density less than about 0.91 g/cc, is greater than about $4 \times 10^6$ dynes/cm$^2$. The critical shear rate at the onset of surface melt fracture (OSNF) and the onset of gross melt fracture (OGMF) will be used herein based on the changes of surface roughness and configurations of the extrudates extruded by a GER. Preferably, in the present invention, the substantially linear ethylene polymer will be characterized by its critical shear rate, rather than its critical shear stress.

Substantially linear ethylene polymers also consist of a single polymer component material and are characterized by a single DSC melting peak. The single melting peak is determined using a differential scanning calorimeter standardized with indium and deionized water. The method involves about 5–7 mg sample sizes, a "first heat" to about 140° C. which is held for about 4 minutes, a cool down at about 10°/min. to about –30° C. which is held for about 3 minutes, and heat up at about 10° C./min. to about 180° C. for the "second heat." The single melting peak is taken from the "second heat" heat flow vs. temperature curve. Total heat of fusion of the polymer is calculated from the area under the curve.

For substantially linear ethylene interpolymers having a density of about 0.875 g/cc to about 0.91 g/cc, the single melting peak may show, depending on equipment sensitivity, a "shoulder" or a "hump" on the low melting side that constitutes less than about 12 percent, typically, less than about 9 percent, and more 9-0 typically less than about 6 percent of the total heat of fusion of the polymer. Such an artifact is observable for other homogeneously branched polymers such as EXACT resins and is discerned on the basis of the slope of the single melting peak varying monotonically through the melting region of the artifact. Such an artifact occurs within about 34° C., typically within about 27° C., and more typically within about 20° C. of the melting point of the single melting peak. The heat of fusion attributable to an artifact can be separately determined by specific integration of its associated area under the heat flow vs. temperature curve.

The molecular weight distributions of ethylene (α-olefin polymers are determined by gel permeation chromatography (GPC) on a Waters 150C high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science* Polymer Letters, Vol. 6, p. 621, 1968) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_j = (\Sigma w_i(M_i^j))^j$; where $w_i$ is the weight fraction of the molecules with molecular weight $M_i$ eluting from the GPC column in fraction i and j=1 when calculating $M_w$, and j=−1 when calculating $M_n$.

For the homogeneously branched substantially linear ethylene polymer or homogeneously branched linear ethylene polymer used in the present invention, the $M_w/M_n$ is preferably less than 3.5, more preferably less than 3.0, most preferably less than 2.5, and especially in the range of from about 1.5 to about 2.5 and most especially in the range from about 1.8 to about 2.3.

Substantially linear ethylene polymers are known to have excellent processability, despite having a relatively narrow molecular weight distribution (that is, the $M_w/M_n$ ratio is typically less than about 3.5). Surprisingly, unlike homogeneously and heterogeneously branched linear ethylene polymers, the melt flow ratio ($I_{10}I_2$) of substantially linear ethylene polymers can be varied essentially independently of the molecular weight distribution, $M_w/M_n$. Accordingly, the preferred ethylene α-olefin polymer for use in the present invention is a substantially linear ethylene polymer.

A preferred polymer mixture of the invention will be characterized as having a compositional hexane extractive level of less than 15 percent, preferably less than 10 percent, more preferably less than 6, most preferably less than 3 percent based on the total weight of the mixture.

Temperature rising elution fractionation (TREF) such as described by Wild et al. can be used to "fingerprint" or identify the novel mixtures of the invention.

Another preferred polymer mixture of the invention will be characterized by a Vicat softening point of at least 75° C., preferably at least 85° C., and more preferably at least 90° C.

In another embodiment, a sealant layer is characterized as having, for a minimum sealing strength of about 1.8 Newtons/15 mm, a film heat seal initiation temperature in the range from equal to or at least 4.5° C. lower than the Vicat softening temperature of the layer and, more preferably, in particular embodiments, a film heat seal initiation temperature in the range from equal to or at least 6° C. lower than the Vicat softening temperature of the layer.

Another embodiment of the present invention is a process for fabricating a multilayer structure or for fabricating the polymer mixture of the invention into the form of a film, film layer, coating, thermoformed or molded article. The process can include a lamination and coextrusion technique or combinations thereof, or using the polymer mixture alone, and can also specifically include blown film, cast film, extrusion coating, injection molding, blow molding, thermoforming, profile extrusion, pultrusion, compression molding, rotomolding, or injection blow molding operations or combinations thereof.

The polymer mixture of the invention can be formed by any convenient method, including dry blending the individual components and subsequently melt mixing in a mixer or by mixing the components together directly in a mixer (e.g., a Banbury mixer, a Haake mixer, a Brabender internal mixer, or a single or twin screw extruder including a compounding extruder and a side-arm extruder employed directly down stream of a interpolymerization process.

The polymer mixture used in the invention (as well as the at least one first ethylene polymer and the at least one second ethylene polymer) can be formed in-situ via the interpolymerization of ethylene and the desired α-olefin using a single-site catalysis, preferably a single-site constrained geometry catalyst, in at least one reactor and a single-site catalysis, preferably a single-site constrained geometry catalyst, or a Ziegler-Natta type catalyst in at least one other reactor. The reactors can be operated sequentially or in parallel. An exemplary in-situ interpolymerization process is disclosed in PCT Patent Application 94/01052, incorporated herein by reference.

The polymer mixture used in the invention (as well as the at least one first ethylene polymer and the at least one second ethylene polymer) can further be formed by isolating component (A) and/or component (B) from a heterogeneously branched ethylene polymer by fractionating the heterogeneous ethylene polymer into specific polymer fractions (or by isolating component (A) from a homogeneously branched ethylene polymer by fractionating the homogeneously ethylene polymer into polymer fractions), selecting the fraction(s) appropriate to meet the limitations specified for component (A) or component (B), and mixing the selected fraction(s) in the appropriate amounts with the at least one first ethylene polymer component (A) or the at least one second ethylene polymer component (B). This method is obviously not as economical as the in-situ polymerization described above, but can nonetheless be used to obtain the polymer mixture used in the present invention as well as the at least one first ethylene polymer and the at least one second ethylene polymer.

However, regardless of how the polymer mixture, the at least one first ethylene polymer or the at least one second ethylene polymer is manufactured, the mixture or polymer will be considered a homogeneously branched ethylene polymer or, alternatively, a heterogeneously branched ethylene polymer based on the above definitions of that refer to heterogeneous branching and homogeneous branching (i.e., the SCBDI) and based on specific whole composition analysis (such as, for example, ATREF results) rather than fractional analysis or manufacturing technique.

Additives, such as antioxidants (e.g., hindered phenolics, such as IRGANOX™1010 or IRGANOX™1076 supplied by Ciba Geigy), phosphites (e.g., IRGAFOS™168 also supplied by Ciba Geigy), cling additives (e.g., PIB), SANDOSTAB PEPQ™ (supplied by Sandoz), pigments, colorants, fillers, anti-stats, processing aids, and the like may also be included in the polymer mixture of the present invention or in films formed from the same. Although generally not required, films, coatings and moldings formed from the polymer mixture of the present invention may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, may also be added to enhance the antistatic characteristics of films, coatings and moldings formed from the polymer mixture of the invention and permit the use of these polymer mixtures in, for example, the heavy-duty packaging of electronically sensitive goods.

The polymer mixture of the invention may further include recycled and scrap materials and diluent polymers, to the extent that the balanced sealant properties are maintained. Exemplary diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof.

The polymer mixture of the invention may find utility in a variety of applications. Applications are thought to include, for example, but not limited to, multilayer packaging structures consisting of biaxially oriented polyolefins such as biaxially oriented polypropylene film and biaxially oriented ethylene polymer films for shrink film and barrier shrink applications, packages formed via horizontal or vertical form/fill/seal machinery, cook-in packaged foods, molded containers, liners, gaskets and lidding stock.

Biaxially oriented film structures are used for their enhanced strength, clarity, gloss, stiffness, barrier and/or shrink properties. Biaxially oriented film structures find utility in various packaging and storage applications for non-foodstuffs and food items such as primal and subprimal cuts of meat, ham, poultry, bacon, cheese, etc. A typical biaxially oriented film structure utilizing the polymer mixture of the invention may be a two to seven layer structure, with a sealant layer (such as the polymer mixture of the invention), an outer layer (such as, for example, a heterogeneously branched linear low density or ultra-low density polyethylene), and a core layer (such as a biaxially oriented polypropylene homopolymer or vinylidene chloride polymer) interposed between. Adhesion promoting tie layers (such as PRIMACOR™ ethylene-acrylic acid (EAA) copolymers available from The Dow Chemical Company, and/or ethylene-vinyl acetate (EVA) copolymers, as well as additional structural layers (such as AFFINITY™ polyolefin plastomers, available from The Dow Chemical Company, ENGAGE™ polyolefin elastomers, available from Dupont Dow Elastomers, DOWLEX™ LLDPE, available from The Dow Chemical Company, ATTANE™ ULDPE, available from The Dow Chemical Company, or blends of any of these polymers with each other or with another polymer, such as EVA) may be optionally employed.

Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terepthalate (PET), polypropylene (especially, oriented polypropylene (OPP) and more especially, biaxially oriented polypropylene), ethylene/vinyl acetate (EVA) copolymers, ethylene/acrylic acid (EAA) copolymers, ethylene/methacrylic acid (EMAA) copolymers, ULDPE, LLDPE, HDPE, MDPE, LMDPE, LDPE, ionomers, graft-modified polymers (e.g., maleic anhydride grafted polyethylene), and paper. Generally, the multilayer structure of the present invention may comprise from 2 to about 7 layers.

Cook-in packaged foods are foods which are prepackaged and then cooked. The packaged and cooked foods go directly to the consumer, institution, or retailer for consumption or sale. A package for cook-in must be structurally capable of withstanding exposure to cook-in time and temperature conditions while containing a food product. Cook-in packaged foods are typically employed for the packaging of ham, turkey, vegetables, processed meats, etc. Because of the relatively high softening point to heat seal and hot tack initiation temperature characteristic of the inventive sealant layer, multilayer film structures comprising the inventive sealant layer are well-suited for cook-in packaging applications.

Vertical form/fill/seal packages are typically utilized for the packaging of flowable materials, such as milk, wine, powders, etc. In a vertical form/fill/seal (VFFS) packaging process, a sheet of the plastic film structure is fed into a VFFS machine where the sheet is formed into a continuous tube by sealing the longitudinal edges of the film together by lapping the plastic film and sealing the film using an inside/outside seal or by fin sealing the plastic film using an inside/inside seal. Next, a sealing bar seals the tube transversely at one end to form the bottom of a pouch. The flowable material is then added to the formed pouch. The sealing bar then seals the top end of the pouch and either burns through the plastic film or a cutting device cuts the film, thus separating the formed completed pouch from the tube. The process Qf making a pouch with a VFFS machine is generally described in U.S. Pat. Nos. 4,503,102 and 4,521,437, the disclosures of which are incorporated herein by reference. Because of the low heat seal and hot tack initiation temperatures, the high hot tack strength and the broad hot tack sealing window characteristics of the inventive sealant layer, multilayer film structures comprising the inventive sealant layer are well-suited for vertical form/fill/seal packaging applications.

Description of Test Methods

Densities are measured in accordance with ASTM D-792 and are reported as grams/cubic centimeter (g/cc). The measurements reported in the Examples below as overall densities were determined after the polymer samples have been annealed for 24 hours at ambient conditions in accordance with ASTM D-792.

The density and weight percent of the first ethylene polymer component (A) for Example manufactured by in situ polymerization using two reactors were determined by an Analytical Temperature Rising Elution Fractionation (ATREF) technique. The hardware and procedures used for the ATREF technique have been previously described, e.g., Wild et al, *Journal of Polymer Science.* Poly. Phys. Ed., 2041(1982), Hazlitt, et al., U.S. Pat. No. 4,798,081 and Chum et al., U.S. Pat. No. 5,089,321, the disclosures of which are incorporated herein by reference.

In short, the polyethylene sample to be measured (dissolved in hot trichlorobenzene) was crystallized in a column containing an inert support by slowly reducing the temperature. An ATREF chromatogram was then generated by eluting the crystallized polyethylene from the column by slowly increasing the temperature of the eluting solvent (trichlorobenzene). FIG. 1 illustrates an ATREF chromatogram for Example 1. The ATREF curve is also frequently called the short chain branching distribution (SCBD), since it indicates how evenly the comonomer (octene) is distributed throughout the sample, e.g., elution temperature decreases as comonomer content increases. The ATREF curve illuminates several key structural features of the polymer mixture used in the present invention. For example, the first ethylene polymer component (A) produced by a constrained geometry catalyst exhibits a unique symmetrical shape (or homogeneous SCBD), i.e., the peak at 65.8° C. In contrast, the second component polymer (B) produced by a conventional Ziegler-Natta catalyst exhibits a bimodal or heterogeneous SCBD, i.e., both the broad and narrow peaks eluting at 88 and 98° C. By integrating the ATREF curve, the fraction of the first ethylene polymer component (A) was determined to be 43 weight percent which is similar to the expected weight fraction based on process data, i.e., 41 wt %.

Based on a calibration curve of ATREF elution temperature versus the density of substantially linear ethylene polymers, the density of the first ethylene polymer component (A) of Example 1 in FIG. 1 was about 0.898 g/cc. That is, the density of the first ethylene polymer component (A) equals $\rho^A$, which is defined by $$\rho^A = 0.83494 + 9.6133 \times 10^{-4}(T_e)$$

where $T_e$ is the ATREF elution temperature of the first ethylene polymer component (A). Given the overall composition density of Example 1 (i.e., 0.918 g/cc) and the first ethylene polymer component (A) weight fraction (i.e., 43 wt %), one can estimate the density of the second component polymer (B) to be about 0.9337 g/cc.

The response from a differential viscometer detector was also plotted in FIG. 1, i.e., the solid symbols. The output from the differential viscometer is the viscosity average molecular weight, $M_v$, which illuminates the variation in molecular weight as a function of elution volume. The Mv response demonstrates that the first ethylene polymer component (A) has a higher molecular weight relative to the second component polymer (B).

In summary, given the ATREF curve, the weight fraction and density of the first component copolymer (A) can be calculated, from which the density of the second component polymer (B) (given the overall density) can also be calculated. The response from the differential viscometer gives an indication of the relative molecular weights of the first and second component polymers. In general, the polymer mixture used in the present invention has a unique ATREF fingerprint.

Melt index measurements for the overall compositions and single component examples was performed according to ASTM D-1238, Condition 190° C./2.16 kilogram (kg). Melt index is inversely proportional to the molecular weight of the polymer. Thus, the higher the molecular weight, the lower the melt index, although the relationship is not linear. Melt index is reported as g/10 minutes. Melt index determinations can also be performed with even higher weights, such as in accordance with ASTM D-1238, Condition 190° C./10 kg, which is known as $I_{10}$.

The term "melt flow ratio" as defined herein in the conventional sense as the ratio of a higher weight melt index determination to a lower weight melt index determination. For measured $I_{10}$ and $I_2$ melt index values, the melt flow ratio is conveniently designated as $I_{10}/I_2$.

A GPC deconvolution routine was used to determine the melt index of the first ethylene polymer component (A). In this routine, GPC data were generated using a Waters 150C high temperature GPC chromatograph as described above. Given experimental elution volumes, molecular weights were calculated using a calibration curve generated from a series of narrow molecular weight distribution polystyrene standards. The GPC data was normalized prior to the deconvolution routine to insure an area of unity under the weight fraction versus log(MW) GPC curve.

In the deconvolution routine, the CGC copolymer was assumed to follow the Bamford-Tompa molecular weight distribution, i.e., Eq. [1], $$w_i(M_i) = \ln(10)\frac{M_i}{M_n}\exp\left(\left(-\frac{M_i(1+\zeta)}{M_n}\right)\right) \times \left(\frac{2+\zeta}{\zeta}\right)^{1/2} \times I_1\left(\frac{M_i\zeta^{1/2}(2+\zeta)^{1/2}}{M_n}\right) \quad [1]$$

where $w_i$ is the weight fraction of polymer with molecular weight $M_i$, $M_n$ is the number average molecular weight, $I_1(x)$ is the modified Bessel function of the first kind of order one, defined by Eq. [2], $$I_1(x) = \sum_b \frac{x^{2b+1}}{2^{2b+1}b!(b+1)!} \quad [2]$$

and $\zeta$ is an adjustable parameter which broadens the molecular weight distribution, as shown in Eq. [3].

$$\frac{M_w}{M_n} = 2 + \zeta \quad [3]$$

The heterogeneously branched second component polymer (B) manufactured by a Ziegler-Natta catalyst was assumed to follow the log-normal distribution, Eq.[4], $$w_i(M_i) = \frac{1}{\beta(2\pi)^{0.5}}\exp\left(-\frac{1}{2}\left(\frac{\log(M_i)-\log(M_o)}{\beta}\right)^2\right) \quad [4]$$

where $w_i$ is the weight fraction of polymer with molecular weight $M_i$, $M_o$ is the peak molecular weight and $\beta$ is a parameter which characterizes the width of the distribution. $\beta$ was assumed to be a function of $M_o$, as shown in Eq. [5].

$$\beta = 5.70506 - 2.52383\mathrm{Log}(M_o) + 0.30024(\mathrm{Log}(M_o))^2 \quad [5]$$

In summary, the GPC deconvolution routine involves a four parameter fit, $M_n$ and $\zeta$ (for the first ethylene polymer component (A) MWD), $M_o$ (for the second component polymer (B) MWD) and the split (weight fraction of the first ethylene polymer component (A)). The non-linear curve-fitting subroutine within SigmaPlot™ supplied by Jandel Scientific (v3.03) was used to estimate these parameters. Given the number average molecular weight of the first ethylene polymer component (A) ($M_n$), Eq.[3], its $I_{10}/I_2$ melt flow ratio and its density, the melt index of the first ethylene polymer component (A) can be calculated using Eq. [6].

$$I_2^{FCPA} = \exp\left(62.782 - 3.8620\mathrm{Ln}(M_w) - 1.7095\mathrm{Ln}\left(\left(\frac{I_{10}}{I_2}\right)^{FCPA}\right) - 16.310 \times \rho^{FCPA}\right) \quad [6]$$

where FCPA denotes first ethylene polymer component (A). FIG. 2 is the deconvoluted GPC chromatogram for Example 1. The symbols (open circles) represent the measured GPC data of Example 1, the solid line is the overall fit to GPC data, the dotted line is the deconvoluted first ethylene polymer component (A) molecular weight distribution and the dash-dot line is the deconvoluted second component polymer (B) molecular weight distribution. The calculated melt index of the first ethylene polymer component (A) was determined to be about 0.28 dg/min.

In summary, given a GPC chromatogram, the weight fraction and melt index of the first ethylene polymer component (A) can be calculated. In addition, the melt index of the second component polymer (B) can also be calculated. In general, the polymer mixture used in the present invention is comprised of at least two polymer component resins and has a unique GPC fingerprint.

Vicat softening point were measured in accordance with ASTM D1525.

EXAMPLES

The following examples are provided for the purpose of explanation, rather than limitation.

Example 1 and Comparative Examples 2–8

In an evaluation to investigate various sealant materials, three layer (ABC) coextrusion film was manufactured on a Bruckner cast tenter-frame BOPP film line. The (B) layer was the core or base of the structure and was maintained as Shell KF 6100 homopolymer polypropylene with a slip and anti-stat additive package. The additive package was provided by using 2.5% by weight of Ampacet 400577 masterbatch which contains a blend of 15 % by weight of anti-static and slip agents in a 30 MFI (at 230° C. with a 2.16 kg weight) polypropylene homopolymer carrier resin. The Shell KF 6100 homopolymer polypropylene resin used as the core or base layer had a MFI of about 3 as measured at 230° C. with a 2.16 kg weight.

The (A) and (C) layers were produced as variable sealant skin layers using the same sealant material for both layers through the evaluation. An additive masterbatch containing slip and antiblock additives was added to the sealant layers to provide about 1250 ppm of erucamide and about 1500 ppm of $SiO_2$. Example 1 and Comparative Examples 2–8 were the various sealant materials investigated in this evaluation.

Preparation of Example 1 and Comparative Example 6

Example 1 and Comparative 6 was prepared using an in-situ polymerization and mixture process, such as is disclosed in PCT Patent Application No. 94/01052, the disclosure of which is incorporated herein by reference. The particular production details are set forth as follows.

A. Constrained Geometry Catalyst Preparation

A known weight of the constrained-geometry organometallic complex [((CH$_3$)$_4$C$_5$))-(CH$_3$)$_2$Si—N-(t-C$_4$H$_9$)]Ti (CH$_3$)$_2$ is dissolved in Isopar™ E hydrocarbon (available from Exxon Chemical Company) to give a clear solution with a titanium (Ti) concentration of $9.6\times10^{-4}$ M. A similar solution of the activator complex tris(perfluorophenyl) borane ($3.8\times10^{-3}$ M) is also prepared. A known weight of methylalumoxane (available from Texas Alkyls as MMAO) is dissolved in n-heptane to give a solution with an MMAO concentration of $1.06\times10^{-2}$ M. These solutions are independently pumped such that they are combined just prior to being fed into the first polymerization reactor and such that the constrained geometry catalyst, the activator complex, and the MMAO are in a molar ratio of 1:3.5:7.

B. Heterogeneous Catalyst Preparation

A heterogeneous Ziegler-type catalyst was prepared substantially according to the procedure of U.S. Pat. No. 4,612,300 (Example P), by sequentially adding to a volume of Isopar™ E hydrocarbon, a slurry of anhydrous magnesium chloride in Isopar™ E hydrocarbon, a solution of EtAlCl$_2$ in n-hexane, and a solution of Ti(O-iPr)$_4$ in Isopar™ E hydrocarbon, to yield a slurry containing a magnesium concentration of 0.166 M and a ratio of Mg/Al/Ti of 40.0:12.5:3.0. An aliquot of this slurry and a dilute solution of $Et_3Al$ (TEA) were independently pumped with the two streams being combined just prior to introduction into the second polymerization reactor to give an active catalyst with a final TEA:Ti molar ratio of 6.2:1.

C. Polymerization Process

Ethylene was fed into a first reactor at a scaled rate of 40 lb/hr (18.2 kg/hr). Prior to introduction into the first reactor, the ethylene was combined with a diluent mixture comprising Isopar™ E hydrocarbon (available from Exxon Chemical Company) and 1-octene. With respect to the first polymerization reactor, the 1-octene:ethylene ratio (constituting fresh and recycled monomer) is 0.28:1 (mole percent) and the diluent:ethylene feed ratio was 8.23:1 (weight percent). A homogeneous constrained geometry catalyst and cocatalyst such as prepared above is introduced into the first polymerization reactor. The catalyst, activator, and MMAO scaled flow rates into the first polymerization reactor are $1.64 \times 10^{-5}$ lbs. Ti/hr ($7.4 \times 10^{-6}$ kg Ti/hr), $6.21 \times 10^{-4}$ lbs. activator/hr ($2.82 \times 10^{-4}$ kg activator/hr), and $6.57 \times 10^{-5}$ lbs. MMAO/hr ($3.0 \times 10^{-5}$ kg MMAO/hr), respectively. The polymerization was conducted at a reaction temperature in the range of 70°–160° C.

The reaction product of the first polymerization reactor was transferred to a second reactor. The ethylene concentration in the exit stream from the first polymerization reactor was less than four percent, indicating the presence of long chain branching as described in U.S. Pat. No. 5,272,236.

Ethylene was further fed into a second polymerization reactor at a scaled rate of 120 lbs./hr (54.5 kg/hr). Prior to introduction into the second polymerization reactor, the ethylene and a stream of hydrogen were combined with a diluent mixture comprising IsoparTm E hydrocarbon and 1-octene. With respect to the second polymerization reactor, the 1-octene:ethylene feed ratio (constituting fresh and recycled monomer) was 0.196:1 (mole percent), the diluent:ethylene ratio is 5.91:1 (weight percent), and the hydrogen:ethylene feed ratio is 0.24:1 (mole percent).

A heterogeneous Ziegler-Natta catalyst and cocatalyst as prepared above were introduced into the second polymerization reactor. The catalyst (Ti) and cocatalyst (TEA) concentrations in the second polymerization reactor were $2.65 \times 10^{-3}$ and $1.65 \times 10^{-3}$ molar, respectively. The catalyst and cocatalyst scaled flow rates into the second polymerization reactor are $4.49 \times 10^{-4}$ lbs. Ti/hr ($2.04 \times 10^{-4}$ kg Ti/hr) and $9.14 \times 10^{-3}$ lbs. TEA/hr ($4.15 \times 10^{-3}$ kg TEA/hr) respectively. The polymerization was conducted at a reaction temperature in the range of 150°–220° C. The conversion and production split between the first and second polymerization reactors was such as to yield the "weight percent of the first ethylene polymer component (A)" value for Example 1 and Comparative Example 6 as set forth in Table 1. That is, the weight percent of the first ethylene polymer component (A) represents the split between the first and second polymerization reactors.

To the resulting polymer, a standard catalyst kill agent (1250 ppm Calcium Stearate) and antioxidants (200 ppm IRGANOX™ 1010, i.e., tetrakis [methylene 3-(3,5-di-tert-butyl-4-hydroxy-phenylpropionate)]methane, available from Ciba-Geigy and 800 ppm SANDOSTAB™ PEPq i.e., tetrakis-(2,4-di-tert-butyl-phenyl)-4,4'biphenylphosphonite, available from Sandoz Chemical) were added to stabilize the polymer.

Comparative Example 2 is a polypropylene copolymer having a 5 MFI as measured at 230° C. with a 2.16 kg weight and supplied by Solvay under the designation of KS 4005. Comparative Example 3 is a polypropylene terpolymer having a 5 MFI as measured at 230 C with a 2.16 kg weight and supplied by Solvay under the designation of KS 300. Comparative Example 4 is a substantially linear ethylene polymer supplied by The Dow Chemical Company under the designation of AFFINITY™ PL 1845. Comparative Example 5 is a substantially linear ethylene polymer supplied by The Dow Chemical Company under the designation of AFFINITY™ PL 1850. Comparative Example 7 is a heterogeneously branched linear low density polyethylene resin supplied by The Dow Chemical Company under the designation of DOWLEX™ 2035E. Comparative Example 8 is a heterogeneously branched ultra low density polyethylene resin supplied by The Dow Chemical Company under the designation of ATTANE™ SC4103.

The heat seal initiation temperature for the various sealant layers was determined using a conventional heat seal tester and tensiometer after seals were allowed to age for 24 hours wherein the seal initiation temperature was taken as the temperature where a seal strength of 1.8 N/15 mm was reached. The temperature range over which the hot tack force exceeds 46 g/cm (using the DuPont spring-method) was taken as the hot tack strength window.

"Sufficient interlayer adhesion" was defined as no sign of delamination observed during the coextrusion fabrication step or during sealing and seal testing. Conversely, "poor interlayer adhesion" was taken as the onset of delamination during sealing.

In this evaluation, the layer thicknesses were (A)=1 $\mu$m, (B)=18 $\mu$m and (C)=1 $\mu$m. The side corresponding to layer (C) was Corona treated to a level of about 44 dynes. The materials were extruded at melt temperatures between 245 and 275° C. and chill roll temperature of about 25°–30° C. The temperature of the machine direction orientation (MDO) heated rollers were between about 90 and about 125° C. The draw ratio in the machine direction was about 5:1 and in the transverse direction was about 8:1. The tenter-frame oven temperatures ranged from about 180 to about 160° C.

The densities, melt indices, and weight percent of the first ethylene polymer component (A), the overall melt index, density and Vicat softening point of the resultant polymer mixture and the type of catalyst system employed to manufacture the various examples as well as the heat seal, hot tack and interlayer adhesion performance of the examples are set forth in Table 1.

TABLE 1

| Example | 1 | 2* | 3* | 4* | 5* | 6* | 7* | 8* |
|---|---|---|---|---|---|---|---|---|
| Overall MI, g/10 min. | 2.7 | N/A | N/A | 3.5 | 3.0 | 3.1 | 6.0 | 3.3 |
| Overall Density, g/cc | 0.918 | N/A | N/A | 0.910 | 0.902 | 0.919 | 0.919 | 0.912 |

TABLE 1-continued

| Example | 1 | 2* | 3* | 4* | 5* | 6* | 7* | 8* |
|---|---|---|---|---|---|---|---|---|
| Overall Vicat softening, °C. | 102 | — | — | 90.7 | 82.5 | 99.5 | 105 | 95 |
| Component (A) MI, g/10 min. | 0.28 | N/A | N/A | 3.5 | 3.0 | 0.67 | N/A | N/A |
| Component (A), Density, g/cc | 0.898 | N/A | N/A | 0.910 | 0.902 | 0.901 | N/A | N/A |
| Weight % Component (A) | 41.0 | N/A | N/A | 100.0 | 100.0 | 43.5 | N/A | N/A |
| Catalyst Type | CGC/ZN | N/A | N/A | CGC | CGC | CGC/ZN | ZN | ZN |
| Seal Initiation, °C. | 96 | 120 | 110 | 95 | 90 | 95 | 115 | 110 |
| Hot Tack window (temp range @ > 46 g/cm), °C. | 35 (105–140) | 15 (125–140) | 25 (115–140) | None | None | None | None | None |
| Interlayer Adhesion to Homo-PP Core | Good | Good | Good | Good | Good | Good | Poor | Good |

CGC denotes Constrained geometry catalyst
Z/N denotes Ziegler-Natta catalyst
*Not an Example of the present invention; provided for purposes of comparison only.

In another evaluation, various sealant layer materials were coextruded with PP homopolymer, Shell KF 6100, on conventional cast film equipment and were evaluated for the heat seal and hot tack performance.

The cast coextrusion line was equipped with a 76 cm Johnson flex-lip cast film die. The overall film thickness of each coextruded film sample was 3.0 mils (76.2 microns). The two-layer coextruded film structures consisted of 10% sealant and 90% PP homopolymer, Shell KF 6100. The films were fabricated using a target line speed of about 55 m/min, a target polypropylene homopolymer melt temperature of about 277° C., a target sealant melt temperature of about 265° C. and an air gap of about 12.7 centimeters.

The polymer composition of Comparative Example 9 was AFFINITY™ PL 1845 supplied by The Dow Chemical Company (the same as for Comparative Example 4 above). AFFINITY™ PL 1845 is a single polymer component substantially linear ethylene polymer. The polymer mixtures of Examples 11 and 12 as well as Comparative Examples 10 and 13 were manufactured using two reactors in accordance with the in situ polymerization procedure described above as for Example 1. The melt index of the first ethylene polymer component (A) was determined by the GPC deconvolution routine as described above and the density and weight percent of the first ethylene polymer component (A) were determined by the ATREF technique also as described above as to Example 1.

In this evaluation, none of the samples showed any sign of delamination of the sealant from the polypropylene layer during coextrusion or during heat sealing operations and seal testing.

In this evaluation, the heat seal initiation temperature was defined as the minimum temperature at which a 1 lb./in (2 N/15 mm) seal strength was obtained. Heat seal testing was performed on a Topwave Hot Tack Tester using a 0.5 second dwell time with a 40 psi (0.275 MPa) seal bar pressure. The seals are made at 5° C. increments by folding the sealant layer over and sealing it to itself. The so-formed seals are pulled at least 24 hours after they were made using an Instron tensiometer at a 10 in/min. (250 mm/min) crosshead rate.

Also in this evaluation, ultimate hot tack was defined as the maximum hot tack strength achieved within the normal range tested, i.e. 60–120 C. Hot tack testing was also performed using the Topwave Hot Tack Tester set at a 0.5 second dwell, 0.2 second delay time, and 40 psi (0.275 MPa) seal bar pressure. Hot tack seals were made at 5° C. increments by folding the sealant layer over and hot tack sealing it to itself. The peel rate applied to the so-formed hot tack seals was of 150 mm/sec. The tester was programmed to pull the seals immediately after the 0.2 second delay.

Table 2 summarizes the heat seal and hot tack data obtained for the 3.0 mil cast film coextrusions:

TABLE 2

| Example | Heat Seal Initiation Temp. (°C.) | Ultimate Hot Tack Strength, lbs./in. | Overall MI dg/min | Overall density dg/min | First ethylene polymer component MI (dg/min) | First ethylene polymer component $M_n$ (g/mole) | First ethylene polymer component Density (dg/min) | % First ethylene polymer component Fraction (dg/10 min) |
|---|---|---|---|---|---|---|---|---|
| Comparative Example 9 | 88 | 5.6 | 3.5 | 0.910 | 3.5 | 29313 | 0.910 | 100 |
| Comparative Example 10 | 96 | 6.4 | 3.1 | 0.919 | 0.68 | 46605 | 0.901 | 43.5 |
| Example 11 | 93 | 7.0 | 2.8 | 0.917 | 0.39 | 55305 | 0.900 | 41.0 |
| Example 12 | 97 | 7.9 | 2.7 | 0.919 | 0.28 | 62905 | 0.900 | 41.0 |
| Comparative Example 13 | 96 | 6.2 | 3.5 | 0.917 | 0.14 | 67159 | 0.891 | 38.4 |

The data in Table 2 (and as shown in FIG. 3) indicate that there is an optimum first ethylene polymer component (A) molecular weight or melt index for achieving the highest hot tack strength at a constant overall melt index. From these data, a first ethylene polymer component (A) with an $I_2$ melt index in the range of from greater than about 0.14 g/10 minutes to less than about 0.68 g/10 minutes provides an optimized hot tack strength. Comparative Examples 10 and 13 exhibited insufficient hot tack strength for successful use as a sealant layer for cast BOPP film as well as for vertical form fill and seal (VFFS) applications, such as snack food packaging and cereal packaging applications.

We claim:

1. A multilayer structure having a sealant layer and a polypropylene layer, the sealant layer comprising as a polymer mixture:

(A) from about 30 to about 55 weight percent, based on the total weight of the polymer mixture, of at least one first ethylene polymer which is a homogeneously branched substantially linear ethylene/α-olefin polymer containing at least one $C_3$–$C_{20}$ α-olefin, having from about 0.01 to 3 long chain branches per 1000 carbons and characterized as having:
  i. an $I_2$ melt index in the range of from greater than about 0.14 g/10 minutes to less than or equal to about 0.39 g/10 minutes, as measured by ASTM D-1238 Condition 190° C./2.16 kg,
  ii. a density in the range of about 0.885 to about 0.905 g/cc, as measured in accordance with ASTM D-792,
  iii. a molecular weight distribution, $M_w/M_n$, as determined by gel permeation chromatography, in the range of from about 1.8 to about 2.3
  iv. a single differential scanning calorimetry, DSC, melting peak between −30 and 150° C.,
  v. a short chain branching distribution index (SCBDI) greater than 50 percent,
  vi. a melt flow ratio, $I_{10}/I_2$ in the range of from greater than about 6 to less than about 12, and
  vii. a gas extrusion rheology critical shear rate wherein the critical shear rate at the onset of surface melt fracture for the substantially linear ethylene/α-olefin polymer is at least 50 percent greater than the critical shear rate at the onset of surface melt fracture for a linear ethylene/α-olefin polymer containing at least one $C_3$–$C_{20}$ α-olefin, wherein the linear ethylene/α-olefin polymer is characterized as having an and $M_w/M_n$ within ten percent of the substantially linear ethylene/α-olefin polymer, and wherein the critical shear rates of the substantially linear ethylene/α-olefin polymer and the linear ethylene/α-olefin polymer are measured at the same melt temperature using a gas extrusion rheometer, and (B) from about 45 to about 70 weight percent, based on the total weight of the polymer mixture, of at least one second ethylene polymer which is a heterogeneously branched linear ethylene/α-olefin polymer containing at least one $C_3$–$C_{20}$ α-olefin and characterized as having a density in the range of about 0.91 g/cc to about 0.95 g/cc, wherein the polymer mixture is characterized as having a density of from about 0.89 g/cc to about 0.93 g/cc, as measured in accordance with ASTM D-792, and an $I_2$ melt index in the range of from about 1 g/10 minutes to about 5 g/10 minutes, as measured by ASTM D-1238 Condition 190° C./2.16 kg, and wherein the $I_2$ melt index of the at least one first polymer is lower than the $I_2$ melt index of the at least one second polymer and wherein the density of the at least one first polymer is lower than the density of the at least one second polymer.

2. The multilayer structure of claim 1 wherein the polypropylene layer is a biaxially oriented polypropylene layer.

3. The multilayer structure claim 1 wherein the at least one first ethylene polymer is a homogeneously branched substantially linear ethylene polymer characterized as having
  i. a melt flow ratio, $I_{10}/I_2$ in the range of from greater than about 6 to less than about 12,
  ii. a molecular weight distribution, $M_w/M_n$, as determined by gel permeation chromatography and defined by the equation:

$$(M_w/M_n) \leq (I_{10}/I_2) - 4.63,$$

iii. a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer.

4. The multilayer structure of claim 3, wherein the substantially linear ethylene polymer has at least 0.1 long chain branch/1000 carbons.

5. The multilayer structure of claim 3, wherein the substantially linear ethylene polymer has at least 0.3 long chain branch/1000 carbons.

6. The multilayer structure of claim 1, wherein the second ethylene polymer, Component (B), is a heterogeneously branched linear ethylene polymer.

7. The multilayer structure of claim 1, wherein at least one of the first ethylene polymer, Component (A), or the second ethylene polymer, Component (B), is an interpolymer of ethylene and at least one alpha-olefin selected from the group consisting of 1-propylene, 1-butene, 1-isobutylene, 1-hexene, 4-methyl-1 -pentene, 1-pentene, 1-heptene and 1-octene.

8. The multilayer structure of claim 1, wherein at least one of the first ethylene polymer, Component (A), or the second ethylene polymer, Component (B), is a copolymer of ethylene and 1-octene.

9. The multilayer structure of claim 1 wherein the polymer mixture is prepared by mixing the first ethylene polymer and the second ethylene polymer together by at least one of the methods selected from the group consisting of melt mixing extrusion, dry blending, sequential operation of at least two polymerization reactors and parallel operation of at least two polymerization reactors.

10. The multilayer structure of claim 1, wherein the multilayer film structure is at least partly fabricated by a coextrusion technique.

11. The multilayer structure of claim 1, wherein the multilayer film structure is a cook-in package, hot-fill package, flowable material pouch, shrink film or barrier shrink film.

* * * * *